US008228375B2

(12) United States Patent
Liu

(10) Patent No.: US 8,228,375 B2
(45) Date of Patent: Jul. 24, 2012

(54) STEREOSCOPIC DISPLAY DEVICE

(75) Inventor: Chun-Fu Liu, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 646 days.

(21) Appl. No.: 12/426,302

(22) Filed: Apr. 20, 2009

(65) Prior Publication Data

US 2010/0182408 A1    Jul. 22, 2010

(30) Foreign Application Priority Data

Jan. 22, 2009 (TW) ................................ 98102484 A

(51) Int. Cl.
*H04N 13/04* (2006.01)
(52) U.S. Cl. ............... 348/51; 348/42; 348/43; 348/44; 348/45; 348/46; 348/54; 348/55; 345/664; 345/653; 345/696
(58) Field of Classification Search .............. 348/42–60; 345/664, 653, 696
See application file for complete search history.

(56) References Cited

U.S. PATENT DOCUMENTS

| 2005/0083246 | A1* | 4/2005 | Saishu et al. ............... 345/1.1 |
| 2005/0225502 | A1* | 10/2005 | Nam et al. ..................... 345/55 |
| 2007/0058113 | A1 | 3/2007 | Wu et al. |

FOREIGN PATENT DOCUMENTS

JP    2004/040722    2/2004

* cited by examiner

*Primary Examiner* — Joon H Hwang
*Assistant Examiner* — Cheikh Ndiaye
(74) *Attorney, Agent, or Firm* — Winston Hsu; Scott Margo

(57) ABSTRACT

A stereoscopic display device has a plurality of sub-pixel units respectively arranged along a first axis and a second axis. Each sub-pixel unit and the adjacent sub-pixel unit along the first axis have a predetermined dislocation in the second axis. Each of the sub-pixel unit includes a first sub-pixel row having a first sub-pixel and two second sub-pixels arranged along the first axis, a second sub-pixel row under the first sub-pixel row having a first sub-pixel and two second sub-pixels arranged along the first axis, and a three sub-pixel row under the second sub-pixel row having three third sub-pixels arranged along the first axis. The stereoscopic display device also has a parallax panel having a plurality of transparent regions and shielding regions alternately parallel to each other.

18 Claims, 13 Drawing Sheets

FIG. 2 PRIOR ART

STEREOSCOPIC DISPLAY DEVICE

BACKGROUND OF THE INVENTION

1. Field of the Invention

The present invention is related to a stereoscopic display device, and particularly, to a stereoscopic display device having sub-pixels designed for improving chromatic homogeneity.

2. Description of the Prior Art

Stereoscopic display technique provides two separate images individually to the left and right eyes of an observer. When the brain of the observer overlaps and analyzes those separate images, different depths and gradations of each component are perceived, and thus the observer obtains stereoscopic vision. Please refer to FIG. 1, which is a schematic drawing illustrating the stereoscopic display technique. As shown in FIG. 1, a conventional stereoscopic liquid crystal display (LCD) device 100 includes a backlight module 110, an LCD panel 120, and a parallax device 130. The backlight module 110 is positioned at a back-side of the LCD panel 120 for providing lights while the parallax device 130 is positioned at a front-side of the LCD panel 120 for dividing the image signals of the LCD panel 120. When images are shown by the stereoscopic LCD display device 100, those images are separated by the parallax device 130 and respectively captured by the left eye L or right eye R of the observer due to different view angles of the left eye L and right eye R.

Please refer to FIG. 2, which is a conventional sub-pixel design of the stereoscopic LCD panel 120. As shown in FIG. 2, the conventional stereoscopic LCD panel 120 includes a plurality of sub-pixels 122R, 122G, 122B that individually provides red, green, or blue signals. And the sub-pixels 122R, 122G, 122B are arranged in strips as shown in FIG. 2. The stereoscopic LCD panel 120 further includes a parallax device 130 having an oblique-stripe parallax pattern. Through a plurality of transparent regions 132 of the parallax device 130, single left or right eye of the observer obtains images mixed by the sub-pixels. Those skilled in the art would easily realize that only one transparent region is shown in FIG. 2 for clarity. However, since the pixel are constructed by three sub-pixels 122R, 122G, 122B that are obliquely parallel to each other, it is often found that mixture of the sub-pixels is not good enough according to the conventional sub-pixel design.

In order to avoid the abovementioned disadvantage, other sub-pixel design is developed. Please refer to FIG. 3, which is a schematic drawing of a sub-pixel design formed on the LCD panel 120 according to U.S. Patent Application Publication No.: US 2007/0058113, and an image for a single eye through the parallax device 130. According to US 2007/0058113, a plurality of sub-pixels units respectively possessing sub-pixels 124R, 124G, 124B, and a parallax device 130 possessing shielding regions in a grille pattern are provided. Therefore the obtained pixel images include the sub-pixels 124R, 124G, 124B that are arranged in a delta as shown in FIG. 3. According to the sub-pixel design, chromatic homogeneity is expected to be improved. However, the shielding regions 134 of the grille pattern unavoidably shield the sub-pixel 124R, 124G, or 124B of the sub-pixels units. In other words, the shielding region 134 exists in the sub-pixels 124R, 124G, or 124B as shown in FIG. 3. Consequently, distance between the sub-pixels 124R, 124G, 124B of a pixel is increased, and thus chromatic homogeneity and luminance of the stereoscopic display device 100 are deteriorated.

Therefore, a sub-pixel design that is able to improve chromatic homogeneity is needed to further improve image quality and color quality of the stereoscopic display device.

SUMMARY OF THE INVENTION

The present invention provides a stereoscopic display device having sub-pixels designed for improving chromatic homogeneity and consequently improving image quality of the stereoscopic display device.

According to the claimed invention, a stereoscopic display device is disclosed. The stereoscopic display device comprises a plurality of sub-pixel units respectively arranged along a first axis and a second axis to form a sub-pixel array, and at least a parallax panel comprising a plurality of transparent regions and shielding regions in stripes, the transparent regions and the shielding regions are alternately parallel to each other. Each two adjacent sub-pixel units along the first axis comprises a predetermined dislocation along the second axis. The sub-pixel unit comprises a first sub-pixel row extending along the first axis and comprising a first sub-pixel and two second sub-pixels; a second sub-pixel row extending along the first axis and arranged under the first sub-pixel row along the second axis, the second sub-pixel row comprises a first sub-pixel and two second sub-pixels; and a third sub-pixel row extending along the first axis and arranged under the second sub-pixel row along the second axis, the third sub-pixels comprises three third sub-pixels.

According to the claimed invention, another stereoscopic display device is disclosed. The stereoscopic display device comprises a plurality of sub-pixel units respectively arranged along a first axis and a second axis to form a sub-pixel array, and at least a parallax panel comprising a plurality of transparent regions and shielding regions in stripes, the transparent regions and the shielding regions are alternately parallel to each other. Each two adjacent sub-pixel units along the first axis comprises a predetermined dislocation along the second axis. The sub-pixel unit comprises a first sub-pixel row extending along the first axis and comprising two first sub-pixels and two second sub-pixels; a second sub-pixel row extending along the first axis and arranged under the first sub-pixel row along the second axis, the second sub-pixel row comprises two first sub-pixels and two second sub-pixels; and a third sub-pixel row extending along the first axis and arranged under the second sub-pixel row along the second axis, the third sub-pixels comprises four third sub-pixels.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Figure 2:
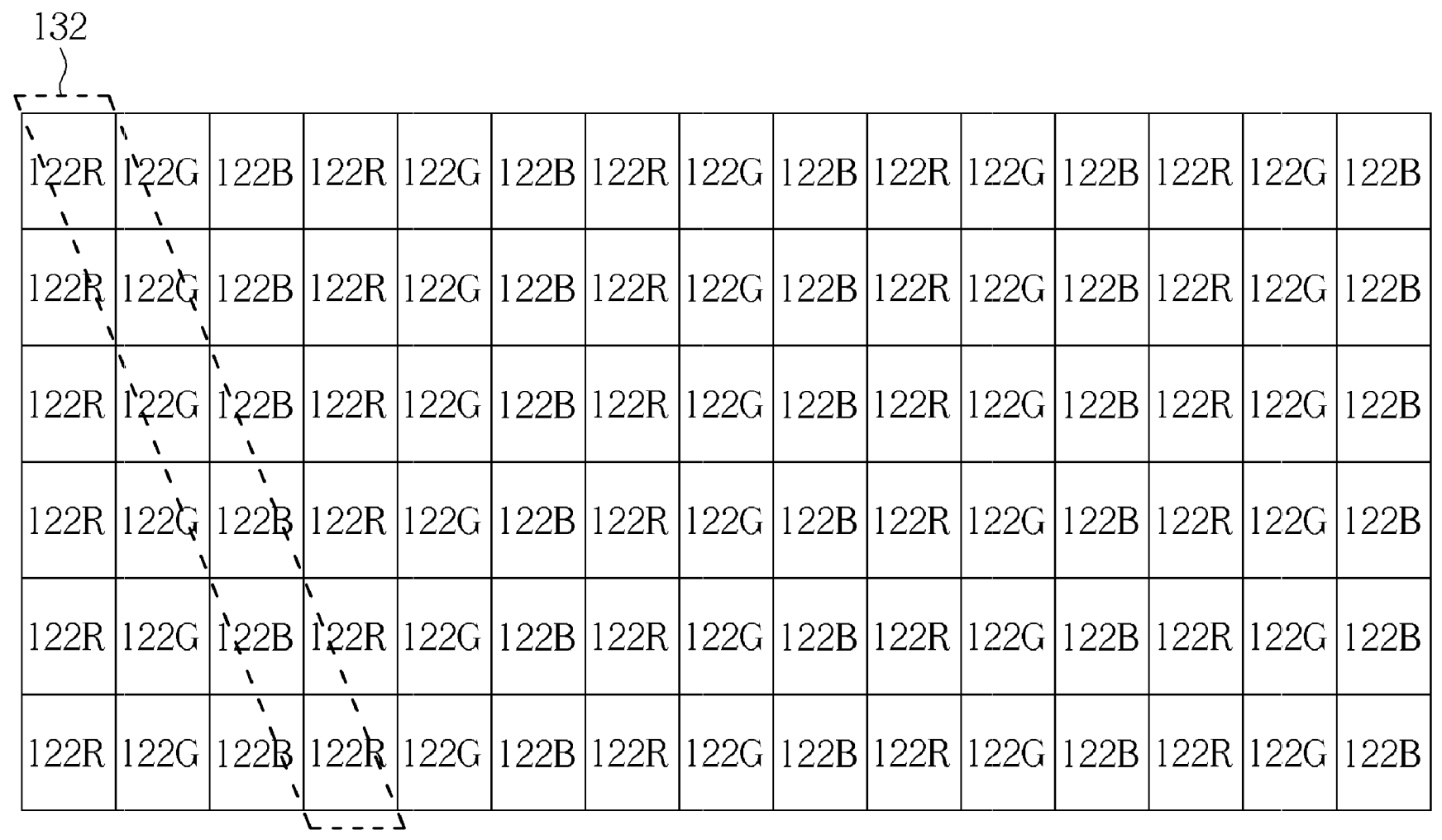

FIG. 2 is a conventional sub-pixel design of a stereoscopic LCD panel.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
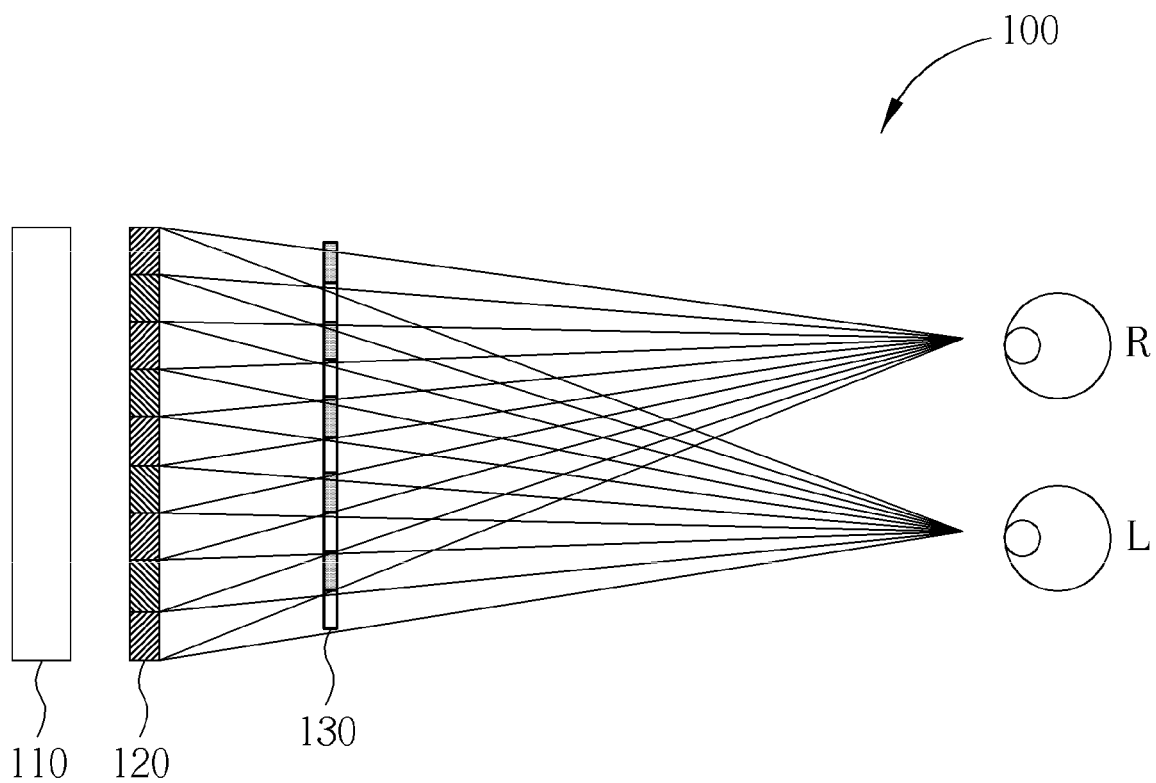
FIG. 1 is a schematic drawing illustrating the stereoscopic display technique.
Figure 3:
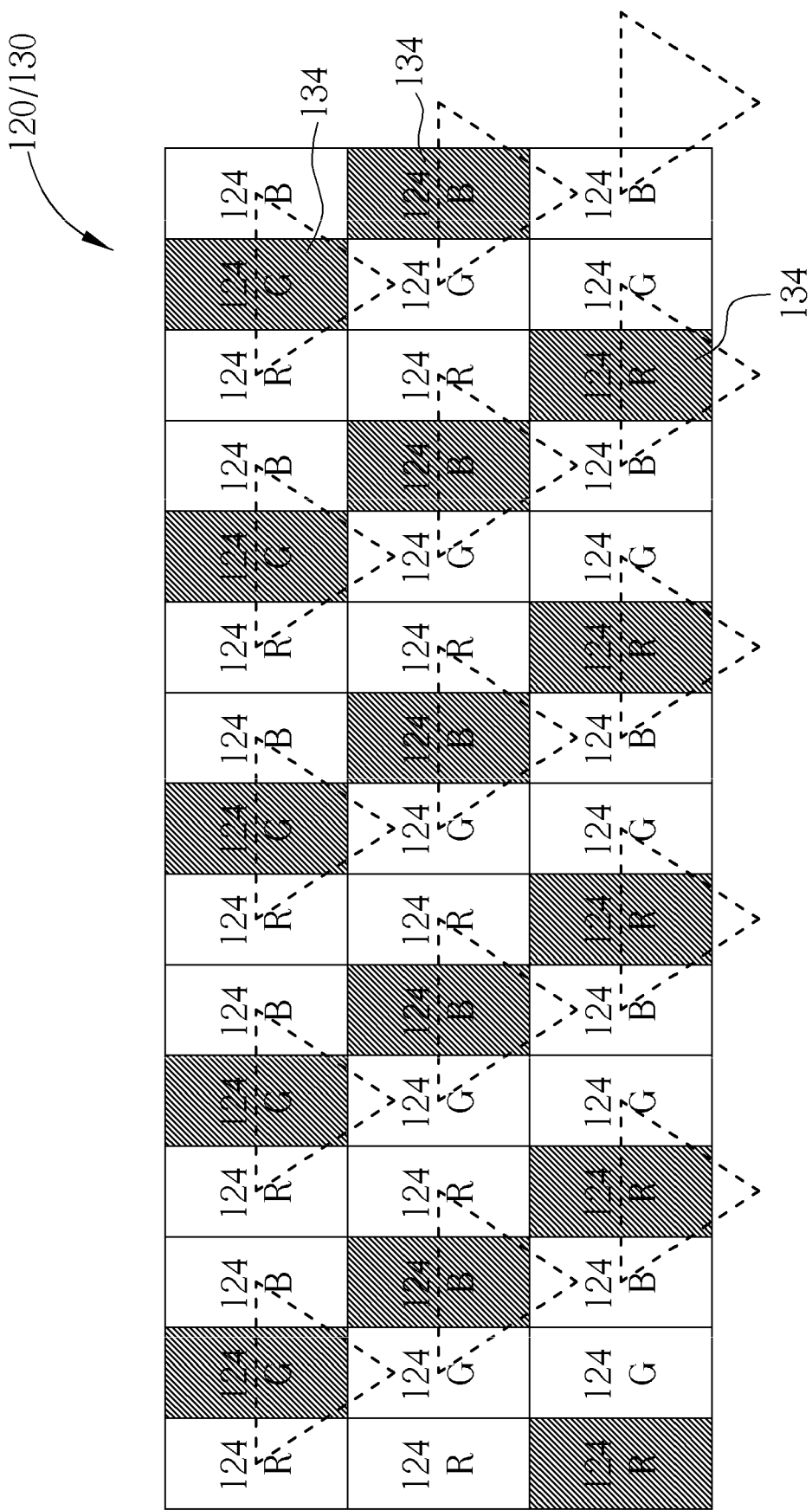
FIG. 3 is a schematic drawing of a sub-pixel design formed on an LCD panel provided by US 2007/0058113 and an image for a single eye through the parallax device.
Figure 4:
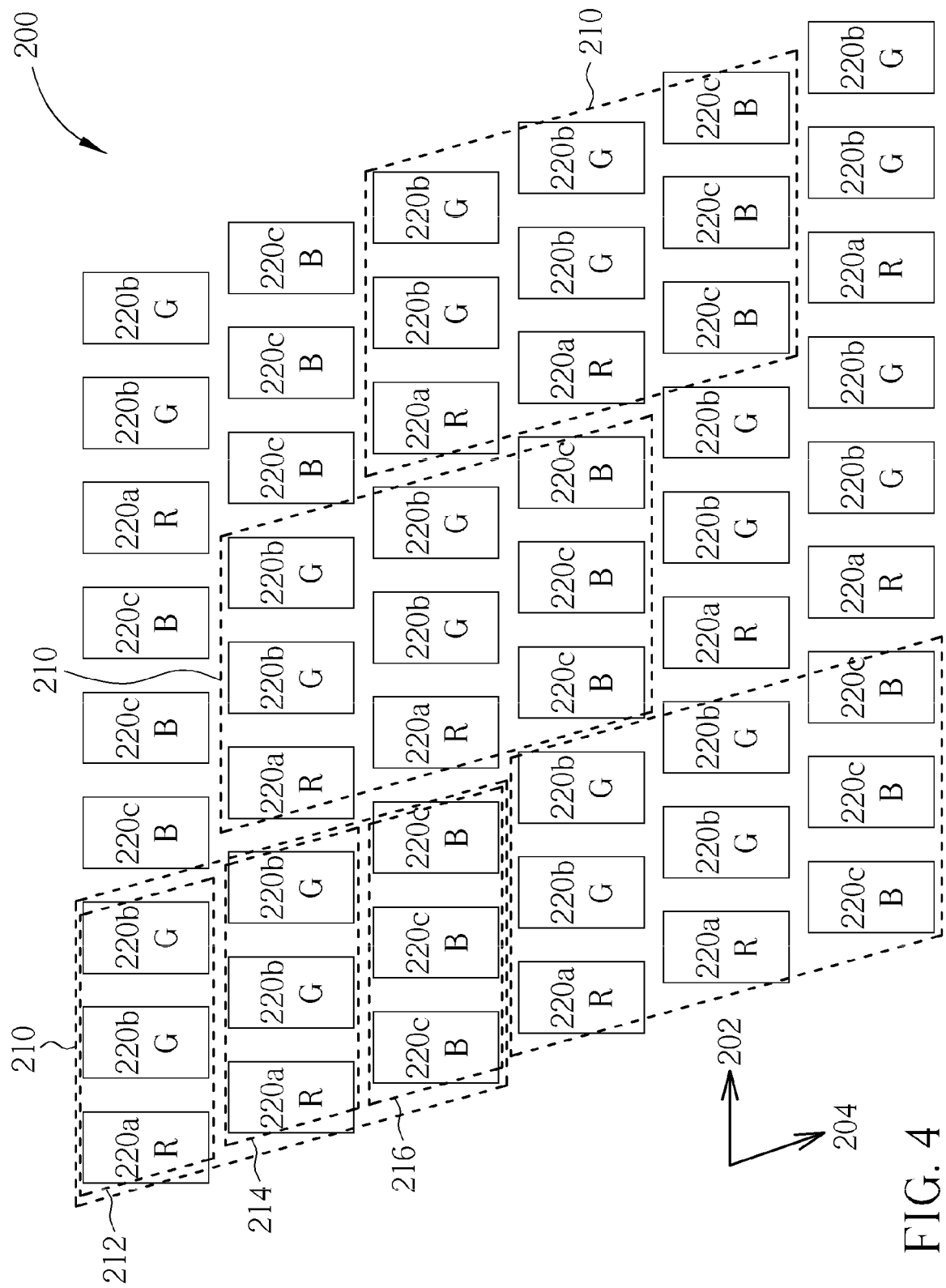
FIG. 4 is a schematic drawing of a stereoscopic display device provided by the first preferred embodiment of the present invention.

Please refer to FIG. 4, which is a schematic drawing of a stereoscopic display device provided by the first preferred embodiment of the present invention. The provided stereoscopic display device is not limited to include LCD panel, organic light-emitting diode (OLED) display panel, filed-emission display (FED) panel, or plasma display panel. As shown in FIG. 4, when the stereoscopic display device is provided with an LCD panel, those skilled in the art would easily realize that a backlight module is further included in the provided stereoscopic display device. In the first preferred embodiment, the stereoscopic display device 200 comprises a plurality of sub-pixels units 210 that respectively arranged along a first axis 202 and a second axis 204 to form a sub-pixel array. Each of the sub-pixels units 210 comprises a first sub-pixel row 212 extending along the first axis 202, a second sub-pixel row 214 extending along the first axis 202 and arranged under the first sub-pixel row 212 along the second axis 204, and a third sub-pixel row 216 extending along the first axis 202 and arranged under the second sub-pixel row 214 along the second axis 204. The first sub-pixel row 212 comprises a first sub-pixel 220a and two second sub-pixels 220b arranged along the first axis 202. The second sub-pixel row 214 comprises a first sub-pixel 220a and two second sub-pixels 220b arranged along the first axis 202. The third sub-pixel row 216 comprises three third sub-pixels 220c arranged along the first axis 202. In the first preferred embodiment, it is preferable that the first sub-pixel 220a, the second sub-pixel 220b and the third sub-pixels 220c substantially possess a same length and a same width but not limited to this. It is noteworthy that each two adjacent sub-pixels units 210 along the first axis 202 comprises a predetermined dislocation along the second axis 204, and the predetermined dislocation is substantially equal to the length of the sub-pixel, but not limited to this either.

As shown in FIG. 4, the first axis 202 and the second axis 204 are oblique which means that an included angle of first axis 202 and the second axis 204 is not equal to 90 degrees. Accordingly, the second sub-pixel row 214 is shifted by one-third to one-half of the width corresponding to the first sub-pixel row 212 along the first axis 202, and the third sub-pixel row 216 is shifted by one-third to one-half of the width corresponding to the second sub-pixel row 214 along the first axis 202. Based on said arrangement for the first sub-pixel row 212, the second sub-pixel row 214 and the third sub-pixel row in each of the sub-pixel units 210, Morie effect is avoided.

Please still refer to FIG. 4. In the first preferred embodiment, the first sub-pixel 220a and the second sub-pixel 220b of the first sub-pixel row 212 and the second sub-pixel row 214 are arranged in an order of: the first sub-pixel 220a, the second sub-pixel 220b, and the second sub-pixel 220b from left to right. The first sub-pixel 220a, the second sub-pixel 220 and the third sub-pixel 220c sequentially are red, green, and blue, but it is not limited to this. In other words, the first sub-pixel 220a, the second sub-pixel 220 and the third sub-pixel 220c sequentially are green, red, and blue.

Figure 5:
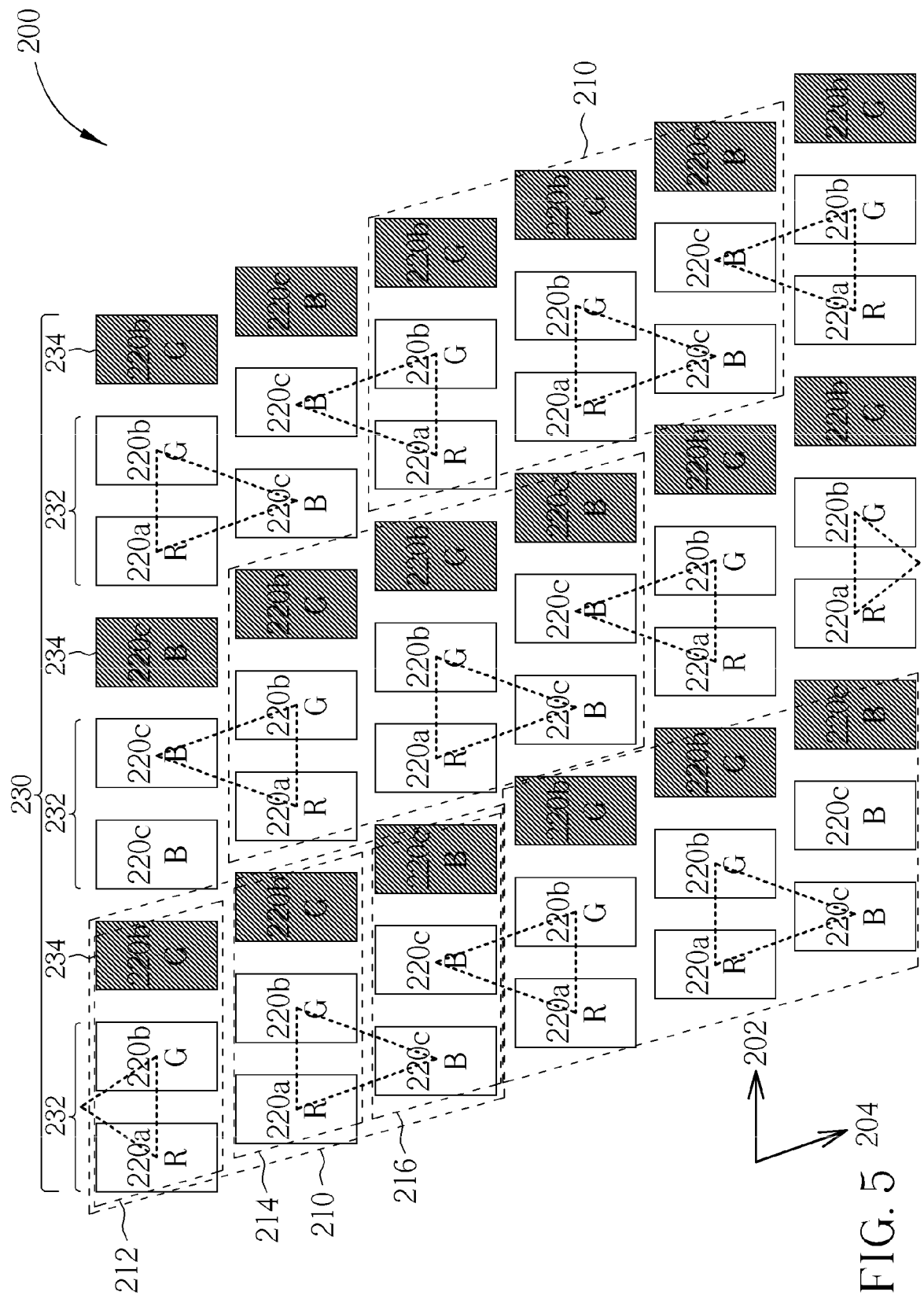
FIG. 5 is a drawing illustrating an image for the left eye provided by the stereoscopic display device according to the first preferred embodiment
Figure 6:
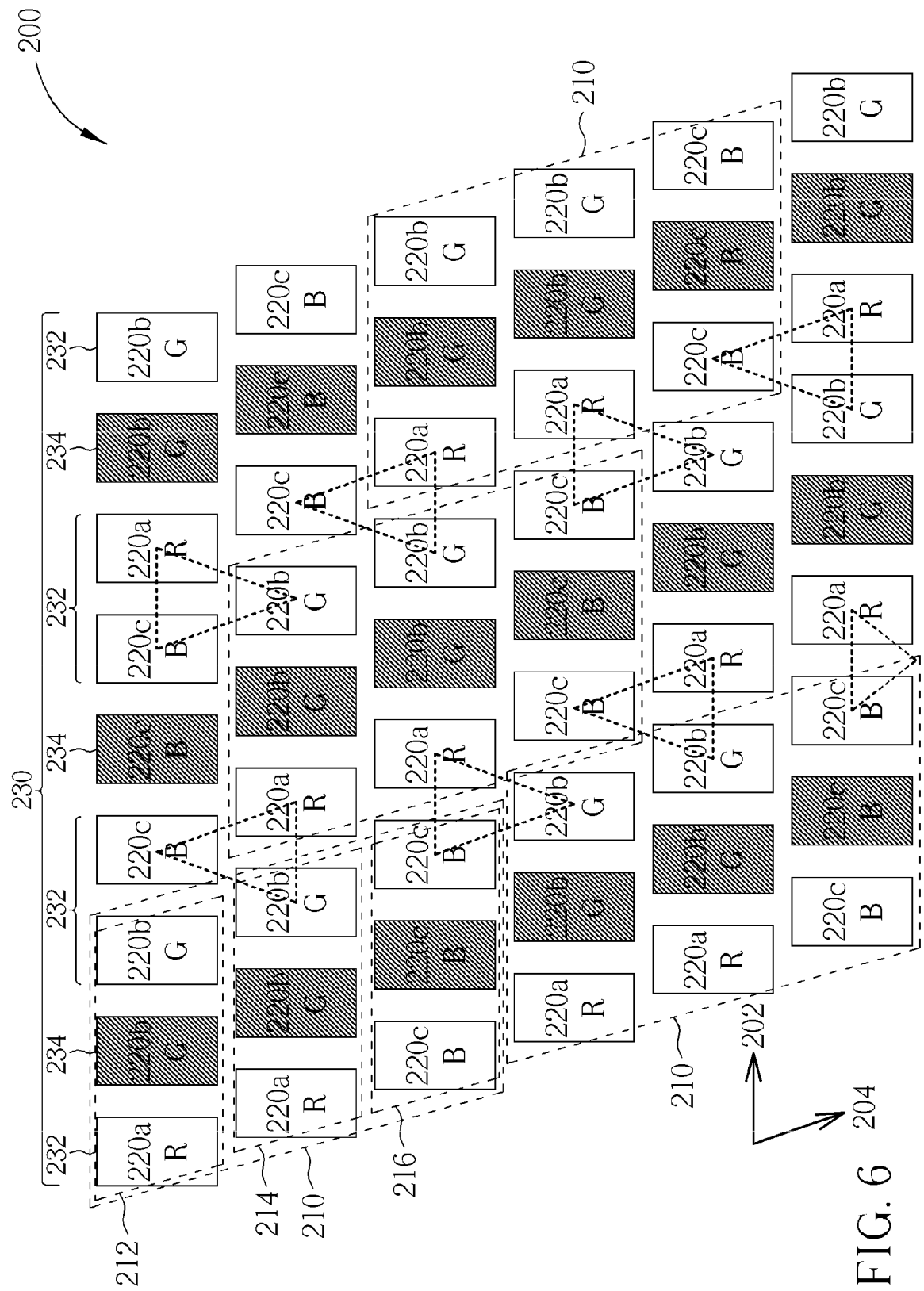
FIG. 6 is a drawing illustrating an image for the right eye provided by the stereoscopic display device according to the first preferred embodiment.

Please refer to FIG. 5, FIG. 6, and synchronously to FIG. 4; FIG. 5 and FIG. 6 are drawings respectively illustrating an image for the left and right eye provided by the stereoscopic display device 200 according to the first preferred embodiment. As shown in FIG. 5 and FIG. 6, the provided stereoscopic display device 200 further comprises at least a parallax panel 230. The parallax panel 230 comprises a plurality of transparent regions 232 and shielding regions 234 in stripes. The transparent regions 232 and the shielding regions 234 are alternately parallel to each other. Furthermore, long sides of the transparent regions 232 and the shielding regions 234 are parallel to the second axis 204. As shown in FIG. 5, in the left eye vision field of an observer, the parallax panel 230 shields the sub-pixels 220b, 220c in the rightmost of each sub-pixel row 212, 214, and 216 due to the different relative position of the left eye. Accordingly, the first sub-pixel 220a in the leftmost of the first sub-pixel row 212, the second sub-pixel 220b in the middle of the first sub-pixel row 212, the first sub-pixel 220a in the leftmost of the second sub-pixel row 214, the second sub-pixel 220b in the middle of the second sub-pixel row 214, and the two third sub-pixels 220c in the leftmost and middle of the third sub-pixel row 216 construct a left eye signal through the transparent region 232 of the parallax panel 230. In detail, in each of the sub-pixels units 210, the first sub-pixel 220a in the leftmost of the second sub-pixel row 214, the second sub-pixel 220b in the middle of the second sub-pixel row 214, and the third sub-pixel 220c in the leftmost of the third sub-pixel row 216 construct a complete pixel for the left eye. Furthermore, the first sub-pixel 220a in the leftmost of the first sub-pixel row 212 of one sub-pixel unit 210, the second sub-pixels 220b in the middle of the first sub-pixel row 212 of the same sub-pixel unit 210, and a third sub-pixels 220c in the middle of the third sub-pixel row 216 of an upper adjacent sub-pixel unit 210 construct another complete pixel for the left eye. Accordingly to said concept, the stereoscopic display device 200 provides a plurality of pixels for the left eye.

Please refer to FIG. 6. In the right eye vision field of the observer, the parallax panel 230 shields the sub-pixels 220a, 220b, 220c in the middle of each sub-pixel row 212, 214, and 216 due to the different relative position of the right eye. Accordingly, the first sub-pixel 220a in the leftmost of the first sub-pixel row 212, the second sub-pixel 220b in the rightmost of the first sub-pixel row 212, the first sub-pixel 220a in the leftmost of the second sub-pixel row 214, the second sub-pixel 220b in the rightmost of the second sub-pixel row 214, and the two third sub-pixels 220c in the leftmost and rightmost of the third sub-pixel row 216 construct a right eye signal through the transparent region 232 of the parallax panel 230. In detail, as shown in FIG. 6, the first sub-pixels 220a in the leftmost of the first sub-pixel row 212 of one sub-pixel unit 210, the second sub-pixel 220b in the rightmost of the second sub-pixel row 214 of a next-to-left sub-pixel unit 210, and the third sub-pixel 220c in the leftmost of the third sub-pixel row 216 of an upper adjacent sub-pixel unit 210 construct a complete pixel for the right eye. Furthermore, the second sub-pixel 220b in the rightmost of the first sub-pixel row 212 of one sub-pixel unit 210, the first sub-pixel 220a in the leftmost of the second sub-pixel row 214 of a next-to-right adjacent sub-pixel unit 210, and the third sub-pixel 220c in the rightmost of the third sub-pixel row 216 of an upper sub-pixel unit 210 construct another complete pixel for the right eye. According to said concept, the stereoscopic display device 200 provides a plurality of pixels for the right eye.

It is noteworthy that, as shown in FIGS. 5 and 6, the pixels for the left and right eyes provided by the first preferred embodiment are constructed by the sub-pixels 220a, 220b, and 220c that are arranged in delta. Therefore the chromatic homogeneity of the stereoscopic display device 200 is improved.

Figure 7:
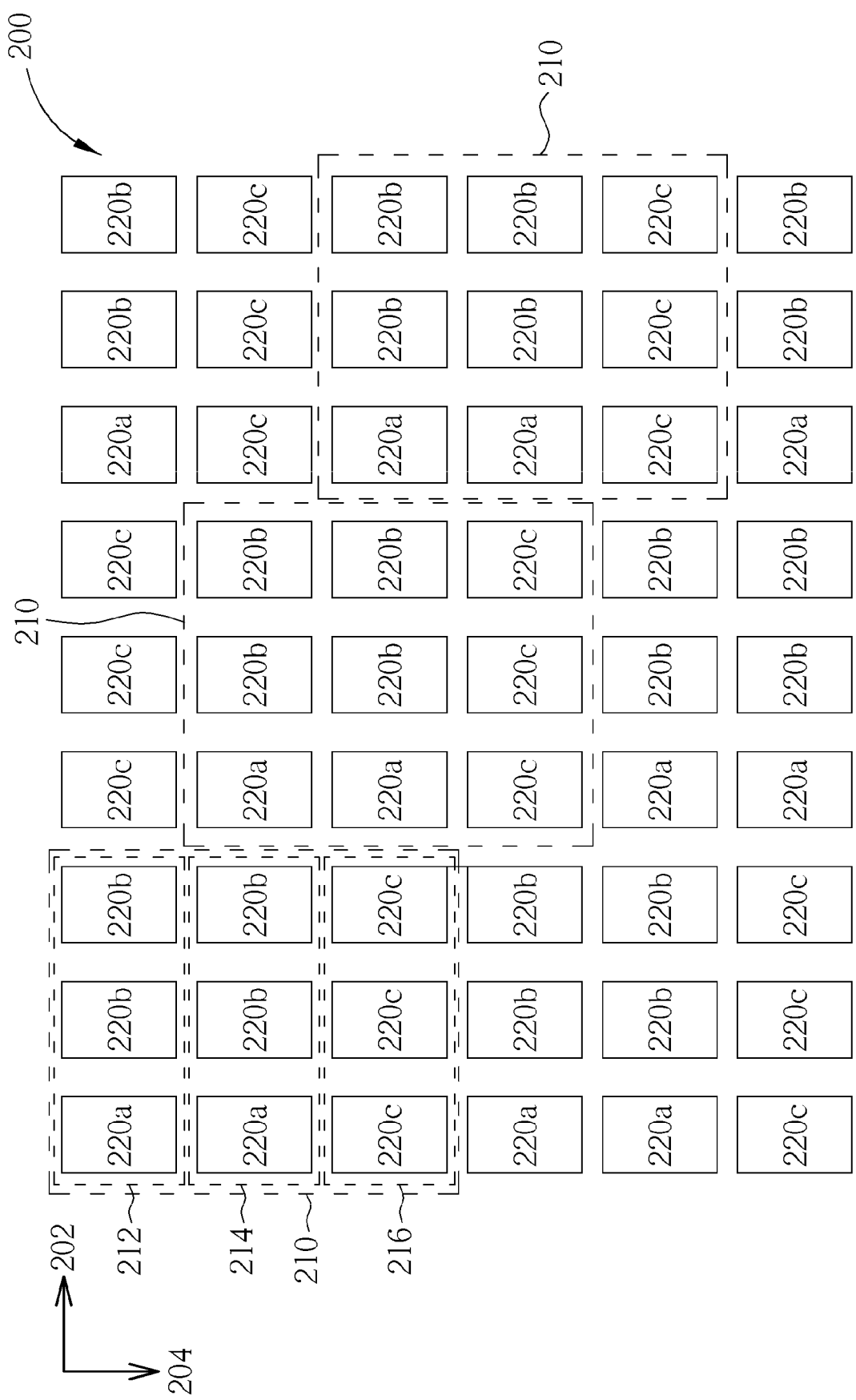
FIG. 7 is a schematic drawing of a modification of the first preferred embodiment.

Please refer to FIG. 7, which is a schematic drawing of a modification of the first preferred embodiment. As shown in FIG. 7, the first axis 202 and the second axis 204 are orthogonal, so as the sub-pixel units 210 are square.

Figure 8:
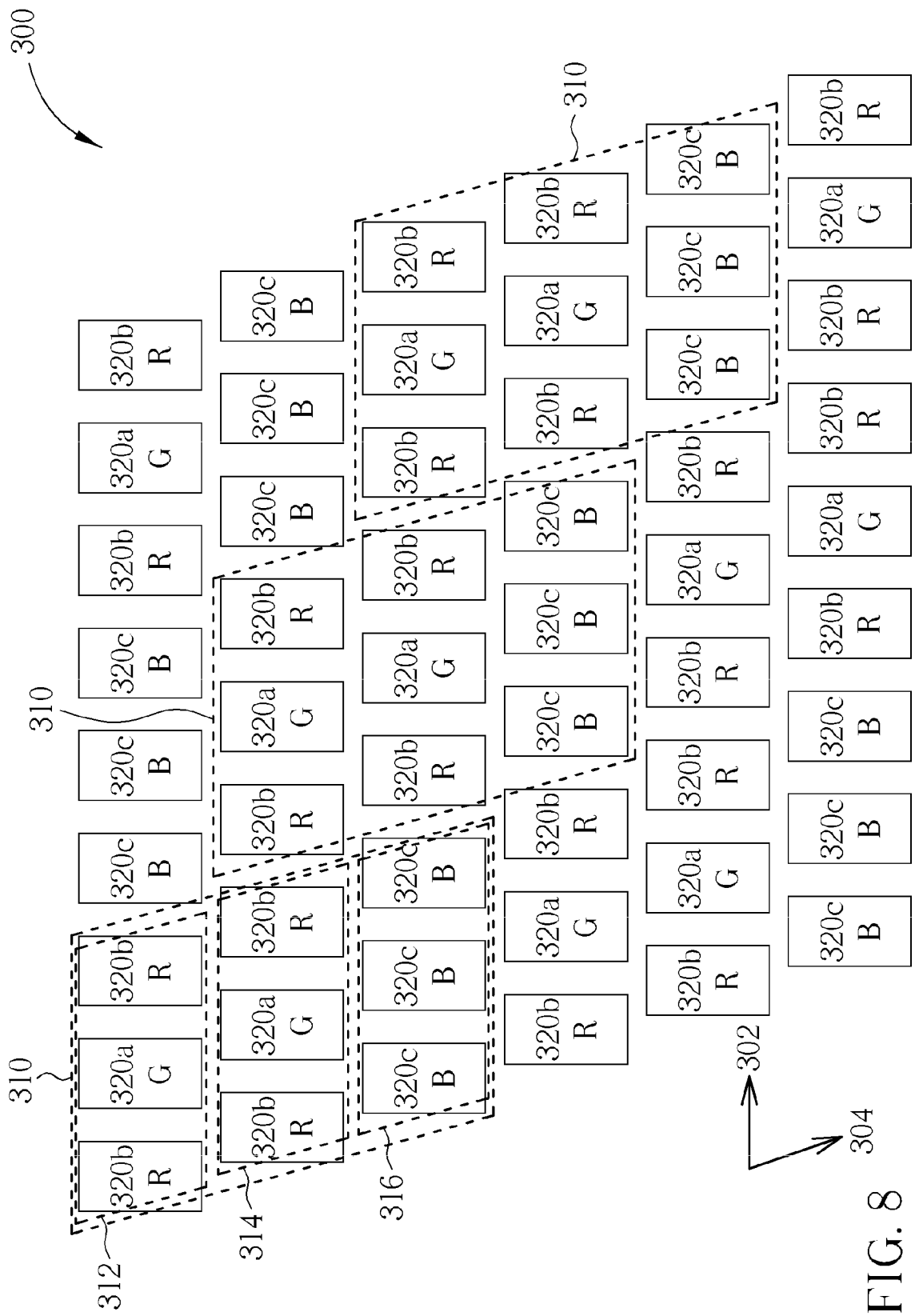
FIG. 8 is a schematic drawing of a stereoscopic display device provided by the second preferred embodiment of the present invention.

Please refer to FIG. 8, which is a stereoscopic display device provided by the second preferred embodiment of the present invention. Since elements of the stereoscopic display device 300 provided by the second preferred embodiment are the same with that provided by the first preferred embodiment and its modification, those elements and details are omitted in the interest of brevity. And only the difference between the arrangement of the sub-pixel units provided by the first and the second preferred embodiments are described.

As shown in FIG. 8. The stereoscopic display device 300 comprises a plurality of sub-pixels units 310 that arranged along a first axis 302 and a second axis 304 to form a sub-pixel array. Each of the sub-pixels units 310 comprises a first sub-pixel row 312 extending along the first axis 302, a second sub-pixel row 314 extending along the first axis 302 and arranged under the first sub-pixel row 312 along the second axis 304, and a third sub-pixel row 316 extending along the first axis 302 and arranged under the second sub-pixel row 314 along the second axis 304. The first sub-pixel row 312 comprises a first sub-pixel 320a and two second sub-pixels 320b arranged along the first axis 302. The second sub-pixel row 314 comprises a first sub-pixel 320a and two second sub-pixels 320b arranged along the first axis 302. The third sub-pixel row 316 comprises three third sub-pixels 320c arranged along the first axis 302. Since arrangement of the sub-pixel rows 312, 314, and 316 are the same with the first preferred embodiment and its modification, those details are also omitted herein. In the second preferred embodiment, the first sub-pixel 320a and the second sub-pixels 320b in the first sub-pixel row 312 and the second sub-pixel row 314 are arranged in a order of: the second sub-pixel 320b, the first sub-pixel 320a, and the second sub-pixel 320b from left to right while the first sub-pixel 320a, the second sub-pixel 320 and the third sub-pixel 320c sequentially are green, red, blue, but it also can be red, green, blue.

Figure 9:
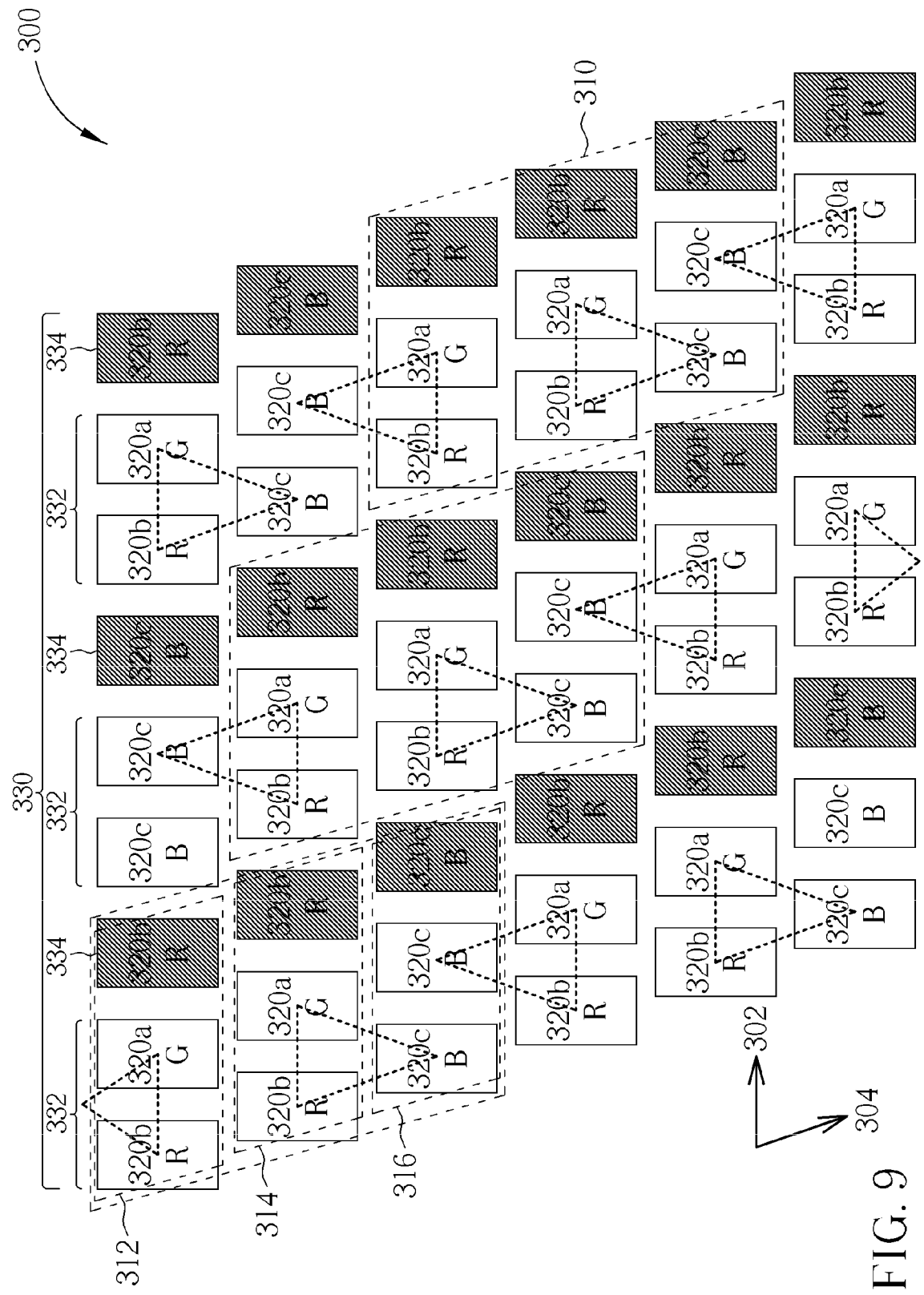
FIG. 9 is a drawing illustrating an image for the left eye provided by the stereoscopic display device according to the second preferred embodiment
Figure 10:
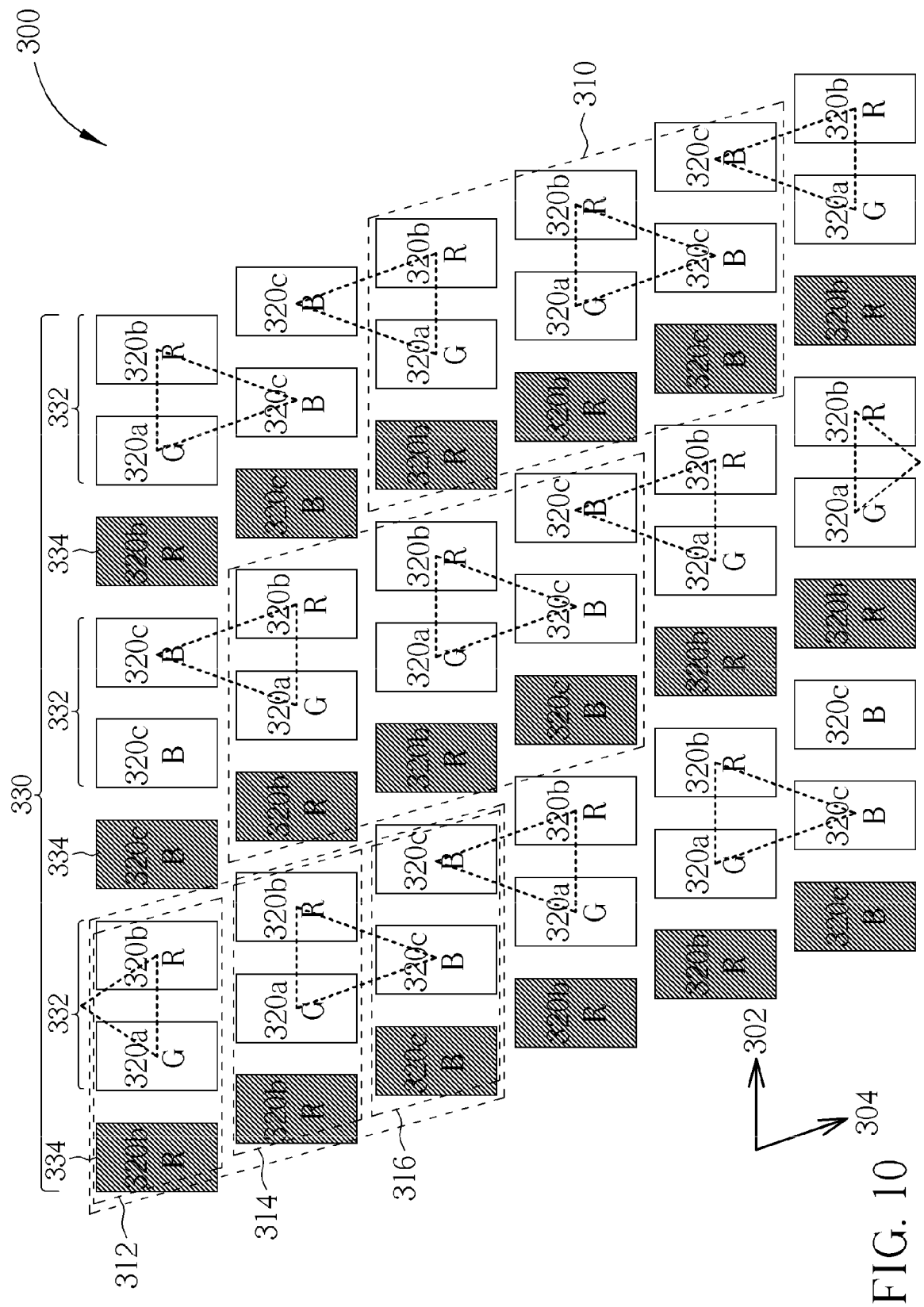
FIG. 10 is a drawing illustrating an image for the right eye provided by the stereoscopic display device according to the second preferred embodiment

Please refer to FIG. 9, FIG. 10, and synchronously to FIG. 8; FIG. 9 and FIG. 10 are drawings respectively illustrating an image for the left eye and right eye provided by the stereoscopic display device 300 according to the second preferred embodiment. As shown in FIGS. 9 and 10, the provided stereoscopic display device 300 further comprises at least a parallax panel 330. The parallax panel 330 comprises a plurality of transparent regions 332 and shielding regions 334 in stripes. The transparent regions 332 and the shielding regions 334 are alternately parallel to each other. Furthermore, long sides of the transparent regions 332 and the shielding regions 334 are parallel to the second axis 304. As shown in FIG. 9, in the left eye vision field of an observer, the parallax panel 330 shields the rightmost sub-pixels 320b, 320c of the sub-pixel row 312, 314, and 316 due to the different relative position of the left eye. Accordingly, the second sub-pixel 320b in the leftmost of the first sub-pixel row 312, the first sub-pixel 320a in the middle of the first sub-pixel row 312, the second sub-pixel 320b in the leftmost of the second sub-pixel row 314, the first sub-pixel 320a in the middle of the second sub-pixel row 314, and the two third sub-pixels 320c in the leftmost and middle of the third sub-pixel row 326 construct a left eye signal through the transparent region 332 of the parallax panel 330. In detail, the second sub-pixel 320b in the leftmost of second sub-pixel row 314, the first sub-pixel 320a in the middle of the second sub-pixel row 314, and the third sub-pixel 320c in the leftmost of the third sub-pixel row 316 of a same sub-pixel unit 310 construct a complete pixel for the left eye. Furthermore, the second sub-pixel 320a in the leftmost of the first sub-pixel row 312 of one sub-pixel unit 310, the first sub-pixel 320a in the middle of the first sub-pixel row 312 of the same sub-pixel unit 310, and a third sub-pixels 320c in the middle of the third sub-pixel row 316 of an upper adjacent sub-pixel unit 310 construct another complete pixel for the left eye. Accordingly to said concept, the stereoscopic display device 300 provides a plurality of pixels for the left eye.

Please refer to FIG. 10. In the right eye vision field of the observer, the parallax panel 330 shields the leftmost sub-pixels 320b, 320c in the sub-pixel rows 312, 314, and 316 due to the different relative position of the right eye. Accordingly, the first sub-pixel 320a in the middle of the first sub-pixel row 312, the second sub-pixel 320b in the rightmost of the first sub-pixel row 312, the first sub-pixel 320a in the middle of the second sub-pixel row 314, the second sub-pixel 320b in the rightmost of the second sub-pixel row 314, and the two third sub-pixels 320c in the middle and rightmost of the third sub-pixel row 316 construct a right eye signal through the transparent region 332 of the parallax panel 330. In detail, as shown in FIG. 10, the first sub-pixels 320a in the middle of the first sub-pixel row 312 of one sub-pixel unit 310, the second sub-pixel 320b in the rightmost of the first sub-pixel row 312 of the same sub-pixel unit 310, and the third sub-pixel 320c in the rightmost of the third sub-pixel row 316 of an upper adjacent sub-pixel unit 310 construct a complete pixel for the right eye. Furthermore, the first sub-pixel 320a in the middle of the second sub-pixel row 314, the second sub-pixel 320a in the rightmost of the second sub-pixel row 314, and the third sub-pixel 320c in the middle of the third sub-pixel row 316 of a same sub-pixel unit 310 construct another complete pixel for the right eye. According to said concept, the stereoscopic display device 300 provides a plurality of pixels for the right eye.

It is noteworthy that, as shown in FIGS. 9-10, the pixels for the left and right eyes provided by the second preferred embodiment are constructed by the sub-pixels 320a, 320b, and 320c that are arranged in delta. Therefore the chromatic homogeneity of the stereoscopic display device 300 is improved.

Figure 11:
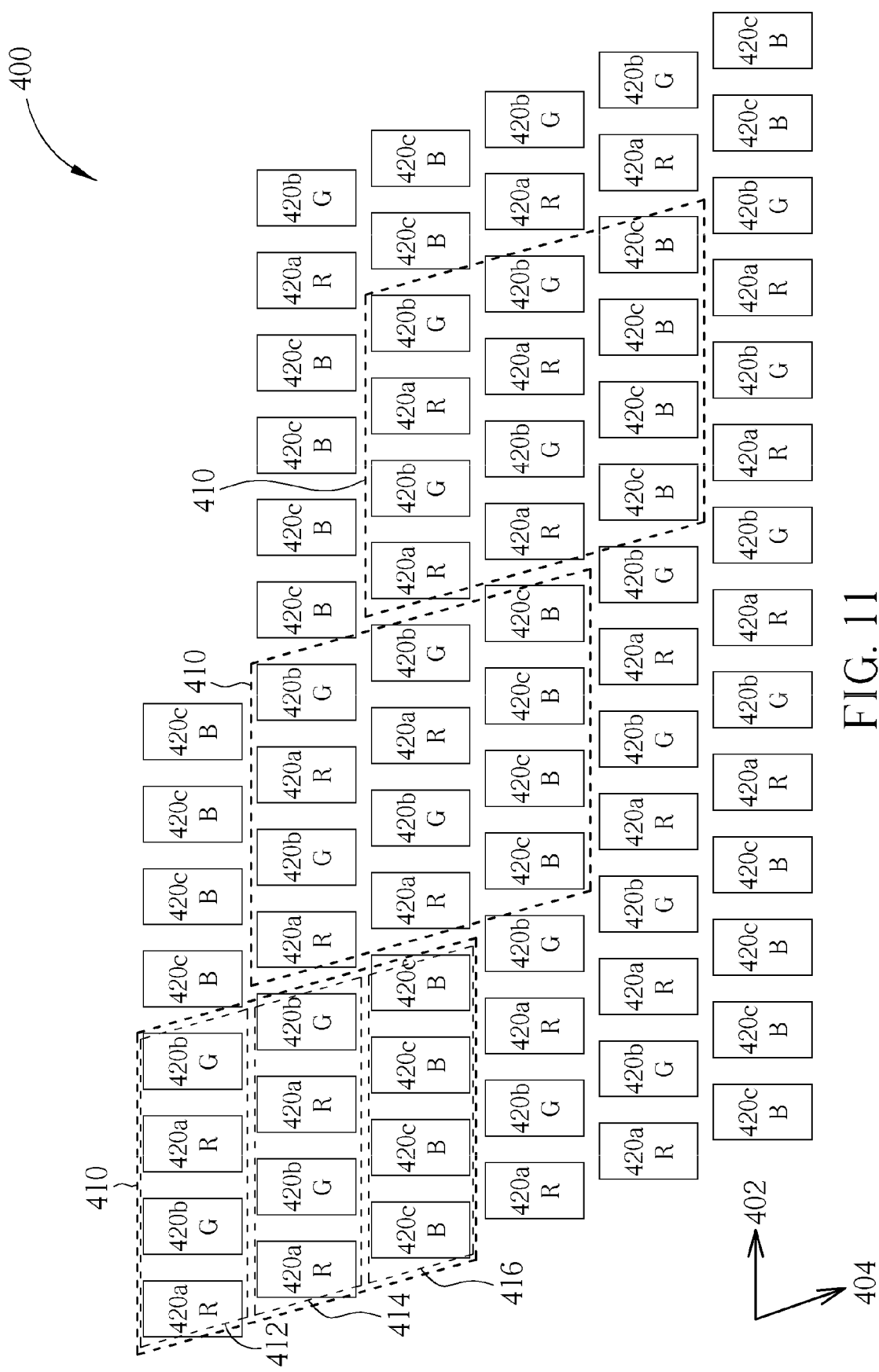
FIG. 11 is a schematic drawing of a stereoscopic display device provided by a third preferred embodiment of the present invention.

Please refer to FIG. 11, which is a stereoscopic display device provided by a third preferred embodiment of the present invention. Since elements of the stereoscopic display device provided by the third preferred embodiment are the same with that provided by the first preferred embodiment and its modification, those elements and details are omitted in the interest of brevity. And only the differences between the arrangement of the sub-pixels units provided by the first and the third preferred embodiments are described.

As shown in FIG. 11, a stereoscopic display device 400 is provided. The stereoscopic display device 400 comprises a plurality of sub-pixel units 410 that arranged along a first axis 402 and a second axis 404 to form a sub-pixel array. Each of the sub-pixels units 410 comprises a first sub-pixel row 412 extending along the first axis 402, a second sub-pixel row 414 extending along the first axis 402 and arranged under the first sub-pixel row 412 along the second axis 404, and a third sub-pixel row 416 extending along the first axis 402 and arranged under the second sub-pixel row 414 along the second axis 404. The first sub-pixel row 412 comprises two first sub-pixels 420a and two second sub-pixels 420b arranged along the first axis 402. The second sub-pixel row 414 comprises two first sub-pixels 420a and two second sub-pixels 420b arranged along the first axis 402. The third sub-pixel row 416 comprises four third sub-pixels 420c arranged along the first axis 402. Since arrangement of the sub-pixel rows 412, 414, and 416 are the same with the first preferred embodiment and its modification, those details are also omitted herein.

Please still refer to FIG. 11, the first sub-pixels 420a and the second sub-pixels 420b of the first sub-pixel row 412 and the second sub-pixel row 414 are arranged in an order of: the first sub-pixel 420a, the second sub-pixel 420b, the first sub-pixel 420a, and the second sub-pixel 420b from left to right. And the first sub-pixel 420a, the second sub-pixel 420b, and the third sub-pixel 420c sequentially are red, green, blue, but it also can be green, red, and blue.

Figure 12:
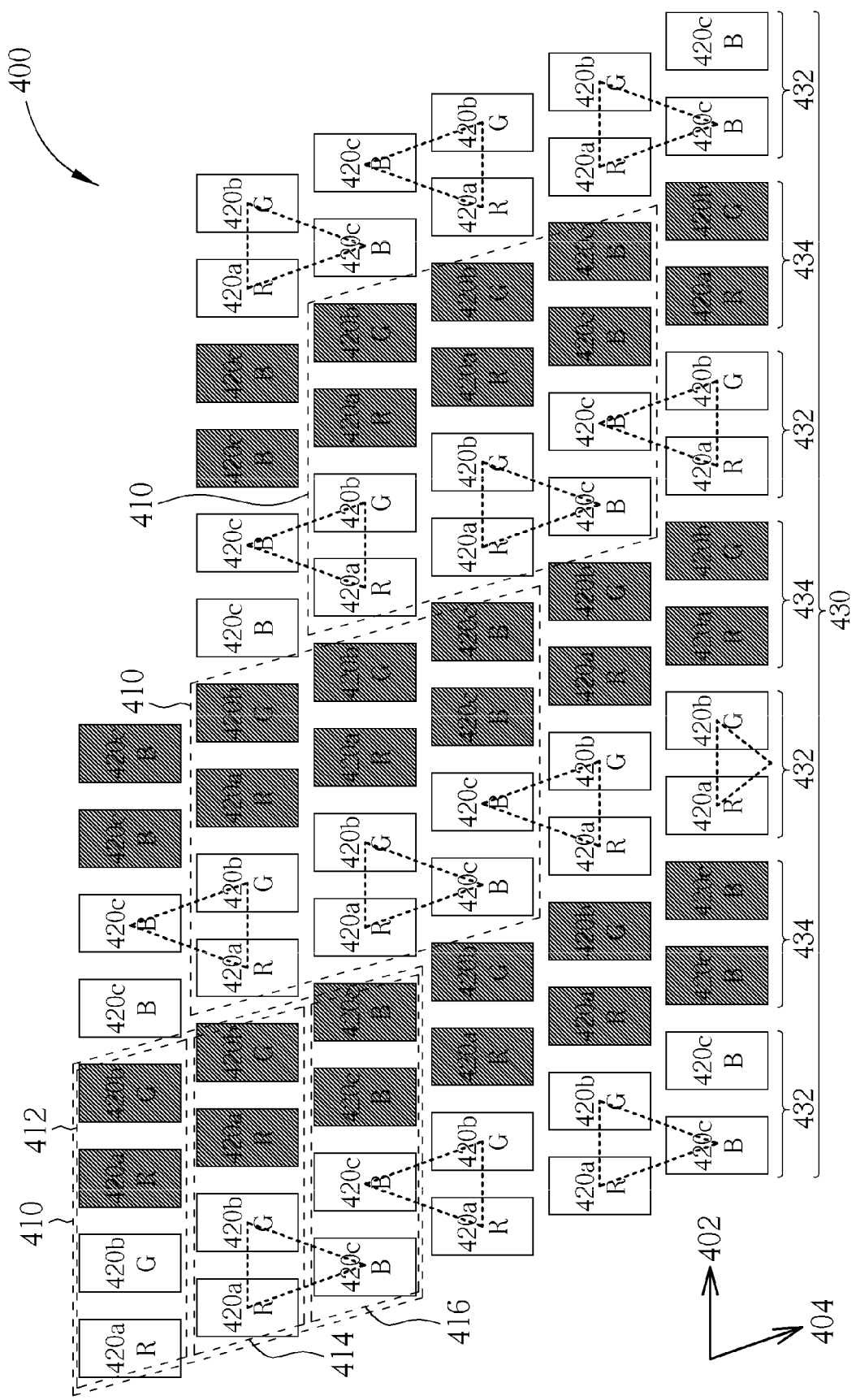
FIG. 12 is a drawing illustrating an image for the left eye provided by the stereoscopic display device according to the third preferred embodiment.
Figure 13:
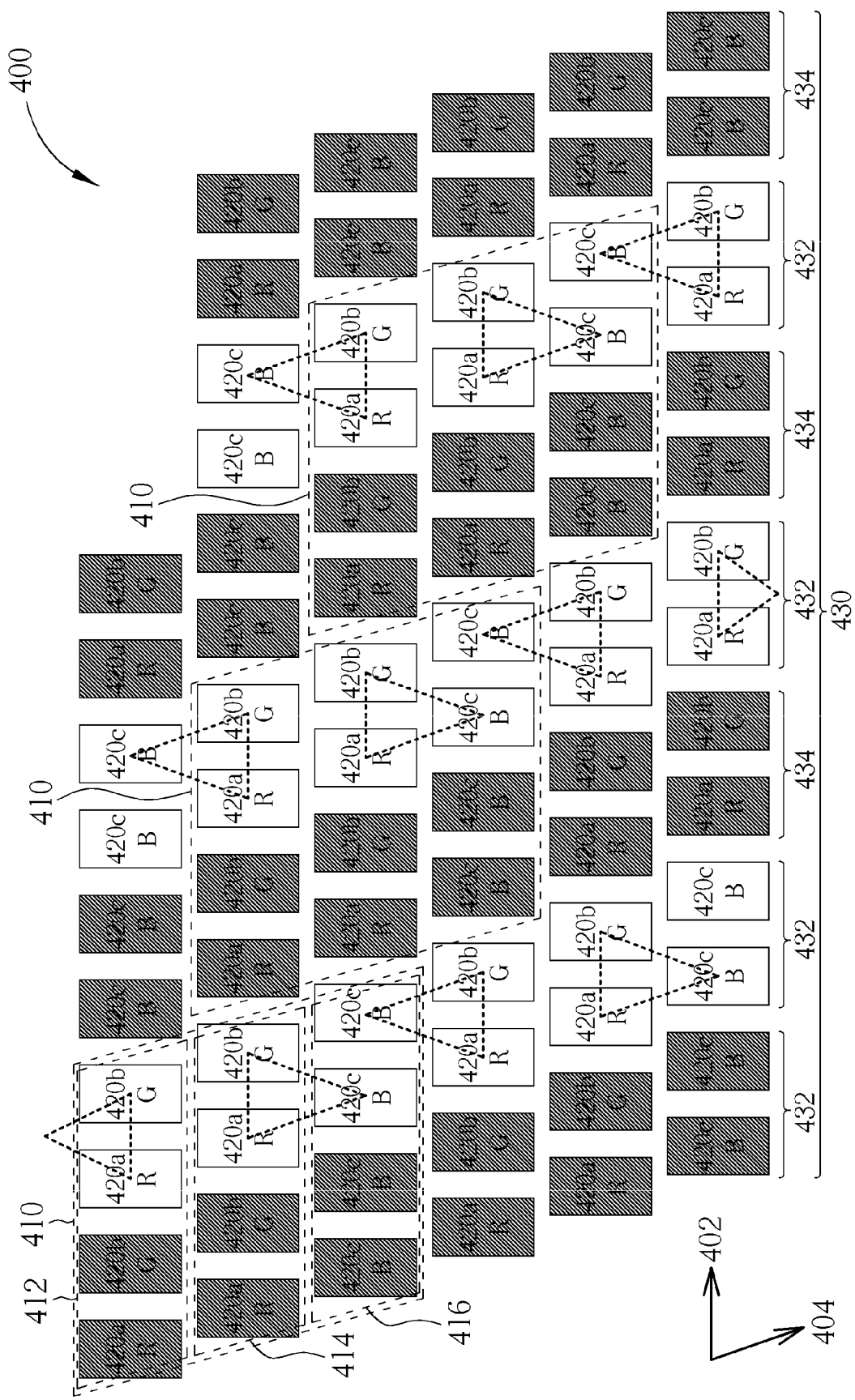
FIG. 13 is a drawing illustrating an image for the right eye provided by the stereoscopic display device according to the third preferred embodiment.

Please refer to FIG. 12, FIG. 13 and synchronously to FIG. 11; FIG. 12 and FIG. 13 are drawings respectively illustrating an image for the left eye and right eye provided by the stereoscopic display device 400 according to the third preferred embodiment. As shown in FIGS. 12 and 13, the provided stereoscopic display device 400 further comprises at least a parallax panel 430. The parallax panel 430 comprises a plurality of transparent regions 432 and shielding regions 434 in stripes. The transparent regions 432 and the shielding regions 434 are alternately parallel to each other. Furthermore, long sides of the transparent regions 432 and the shielding regions 434 are parallel to the second axis 404. As shown in FIG. 12, in the left eye vision field of an observer, the parallax panel 430 shields two rightmost sub-pixels 420a, 420b, 420c in the sub-pixel rows 412, 414 and 416 due to the different relative position of the left eye. Accordingly, the first sub-pixel 420a and the second sub-pixel 420b in the left of the first sub-pixel row 412, the first sub-pixel 420a and the second sub-pixel 420b in the left of the second sub-pixel row 414, and the two third sub-pixels 420c in the left of the third sub-pixel row 416 construct a left eye signal through the transparent region 432 of the parallax panel 430. In detail, the first sub-pixel 420a and the second sub-pixel 420b in the left of the second sub-pixel row 414, and the third sub-pixel 420c in the leftmost of the third sub-pixel row 416 of a same sub-pixel unit 410 construct a complete pixel for the left eye. Furthermore, the first sub-pixel 420a and the second sub-pixel 420b in the left of the first sub-pixel row 412 of a sub-pixel unit 410, and the third sub-pixel 420c in the second on the left in the third sub-pixel row 416 construct another complete pixel for the left eye. Accordingly to said concept, the stereoscopic display device 400 provides a plurality of pixels for the left eye.

Please refer to FIG. 13. In the right eye vision field of the observer, the parallax panel 430 shields the leftmost two sub-pixels 420a, 420b, and 420c in the sub-pixel rows 412, 414, and 416 due to the different relative position of the right eye. Accordingly, the first sub-pixel 420a and the second sub-pixel 420b in the right of the first sub-pixel row 412, the first sub-pixel 420a and the second sub-pixel 420b in the right of the second sub-pixel row 414, and the two third sub-pixels 420c in the right of the third sub-pixel row 416 construct a right eye signal though the transparent region 432 of the parallax panel 430. In detail, as shown in FIG. 13, the first sub-pixel 420a and the second sub-pixel 420b in the right of the second sub-pixel row 414, and the third sub-pixel 420c in the second on the right in the third sub-pixel row 416 of a same sub-pixel unit 410 construct a complete pixel for the right eye. Furthermore, the first sub-pixel 420a and the sub-pixel 420b in the right of the first sub-pixel row 412 of a sub-pixel unit 410, and the rightmost third sub-pixel 420c in the third sub-pixel row 416 of an upper adjacent sub-pixel unit 410 construct another complete pixel for the right eye. Accordingly to said concept, the stereoscopic display device 400 provides a plurality of pixels for the left eye.

It is noteworthy that, as shown in FIGS. 12-13, the pixels for the left and right eyes provided by the third preferred embodiment are constructed by the sub-pixels 420a, 420b, and 420c that are arranged in delta. Therefore the chromatic homogeneity of the stereoscopic display device 400 is improved.

Accordingly to the sub-pixel arrangement designs, the sub-pixel units arrangement designs, and the stereoscopic display device adopted said designs provided by the present invention, the pixels for the left and right eyes are constructed by the sub-pixels that are arranged in delta. It is found that no shielding region is existed in said pixels, therefore distances between each sub-pixels in a pixel is decreased and thus the chromatic homogeneity is improved. Consequently, resolution, image quality, and the color quality of the stereoscopic display device are all improved.

Those skilled in the art will readily observe that numerous modifications and alterations of the device and method may be made while retaining the teachings of the invention.

What is claimed is:

1. A stereoscopic display device comprising:
   a plurality of sub-pixel units respectively arranged along a first axis and a second axis to form a sub-pixel array, wherein each two adjacent sub-pixel units along the first axis comprise a predetermined dislocation along the second axis, and each of the sub-pixel units comprises:
      a first sub-pixel row extending along the first axis and consisting of a first sub-pixel for displaying a first color and two second sub-pixels for displaying a second color different from the first color;
      a second sub-pixel row extending along the first axis and arranged under the first sub-pixel row along the second axis, the second sub-pixel row consisting of a first sub-pixel for displaying the first color and two second sub-pixels for displaying the second color; and
      a third sub-pixel row extending along the first axis and arranged under the second sub-pixel row along the second axis, the third sub pixels sub-pixel row consisting of three third sub-pixels for displaying a third color different from the first color and from the second color;
      wherein the first sub-pixel and the second sub-pixels of the first sub-pixel row are arranged in an order of: the first sub-pixels, the second sub-pixel, and the second sub-pixel from left to right, and the first sub-pixel and the second sub-pixels of the second sub-pixel row are arranged in an order of: the first sub-pixels, the second sub-pixel, and the second sub-pixel from left to right; and at least a parallax panel comprising a plurality of transparent regions and shielding regions in stripes, the transparent regions and the shielding regions are alternately parallel to each other.

2. The stereoscopic display device of claim 1, wherein the first sub-pixel in the leftmost of the first sub-pixel row, the second sub-pixel in the middle of the first sub-pixel row, the first sub-pixel in the leftmost of the second sub-pixel row, the second sub-pixel in the middle of the second sub-pixel row, and the two third sub-pixels in the leftmost and middle of the third sub-pixel row construct a left eye signal through the transparent region of the parallax panel.

3. The stereoscopic display device of claim 1, wherein the first sub-pixel in the leftmost of the first sub-pixel row, the second sub-pixel in the rightmost of the first sub-pixel row, the first sub-pixel in the leftmost of the second sub-pixel row, the second sub-pixel in the rightmost of the second sub-pixel row, and the two third sub-pixels in the leftmost and rightmost of the third sub-pixel row construct a fight eye signal though the transparent region of the parallax panel.

4. The stereoscopic display device of claim 1, wherein the first sub-pixel, the second sub-pixel, and the third sub-pixel sequentially are red, green, blue, or green, red, blue.

5. The stereoscopic display device of claim 1, wherein the first sub-pixel and the second sub-pixels of the first sub-pixel row are arranged in an order of: the second sub-pixel, the first sub-pixel, and the second sub-pixel from left to right, and the first sub-pixel and the second sub-pixels of the second sub-pixel row are arranged in an order of: the second sub-pixel, the first sub-pixel, and the second sub-pixel from left to right.

6. The stereoscopic display device of claim 5, wherein the second sub-pixel in the leftmost of the first sub-pixel row, the first sub-pixel in the middle of the first sub-pixel row, the second sub-pixel in the leftmost of the second sub-pixel row, the first sub-pixel in the middle of the second sub-pixel row, and the two third sub-pixels in the left and middle of the third sub-pixel row construct a left eye signal through the transparent region of the parallax panel.

7. The stereoscopic display device of claim 5, wherein the first sub-pixel in the middle of the first sub-pixel row, the second sub-pixel in the rightmost of the first sub-pixel row, the first sub-pixel in the middle of the second sub-pixel row, the second sub-pixel in the rightmost of the second sub-pixel row, and the two third sub-pixels in the rightmost and middle of the third sub-pixel row construct a right eye signal through the transparent region of the parallax panel.

8. The stereoscopic display device of claim 5, wherein the first sub-pixel, the second sub-pixel, and the third sub-pixel sequentially are green, red, blue, or red, green, blue.

9. The stereoscopic display device of claim 1, wherein the first axis and the second axis are orthogonal, so as the sub-pixel units are square.

10. The stereoscopic display device of claim 1, wherein the first axis and the second axis are oblique, so as the sub-pixel units are parallelogram.

11. The stereoscopic display device of claim 10, wherein the first sub-pixel, the second sub-pixel, and third sub-pixel comprise a width, and the second sub-pixel row is shifted one-third to one-half of the width corresponding to the first sub-pixel row along the first axis, and the third sub-pixel row is shifted one-third to one-half of the width corresponding to the second sub-pixel row along the first axis.

12. A stereoscopic display device comprising: a plurality of sub-pixel units respectively arranged along a first axis and a second axis to form a sub-pixel array, wherein each two adjacent sub-pixel units along the first axis comprise a predetermined dislocation along the second axis, and each of the sub-pixel units comprises:

a first sub-pixel row extending along the first axis and consisting of two first sub-pixel for displaying a first color and two second sub-pixels for displaying a second color different from the first color;

a second sub-pixel row extending along the first axis and arranged under the first sub-pixel row along the second axis, the second sub-pixel row consisting of two first sub-pixel for displaying the first color and two second sub-pixels for displaying the second color; and a third sub-pixel row extending along the first axis and arranged under the second sub-pixel row along the second axis, the third sub pixels sub-pixel row consisting of four third sub-pixels for displaying a third color different from the first color and from the second color;

wherein the first sub-pixels and the second sub-pixels of the first sub-pixel row are arranged in an order of: the first sub-pixel, the second sub-pixel, the first sub-pixel, and the second sub-pixel from left to right, and the first sub-pixels and the second sub-pixels of the second sub-pixel row are arranged in an order of: the first sub-pixel, the second sub-pixel, the first sub-pixel, and the second sub-pixel from left to right; and at least a parallax panel comprising a plurality of transparent regions and shielding regions in stripes, the transparent regions and the shielding regions are alternately parallel to each other.

13. The stereoscopic display device of claim 12, wherein the first sub-pixel and the second sub-pixel in the left of the first sub-pixel row, the first sub-pixel and the second sub-pixel in the left of the second sub-pixel row, and the two third sub-pixels in the left of the third sub-pixel row construct a left eye signal through the transparent region of the parallax panel.

14. The stereoscopic display device of claim 12, wherein the first sub-pixel and the second sub-pixel in the fight of the first sub-pixel row, the first sub-pixel and the second sub-pixel in the right of the second sub-pixel row, and the two third sub-pixels in the fight of the third sub-pixel row construct a right eye signal though the transparent region of the parallax panel.

15. The stereoscopic display device of claim 12, wherein the first sub-pixel, the second sub-pixel, and the third sub-pixel sequentially are red, green, blue, or green, red, blue.

16. The stereoscopic display device of claim 12, wherein the first axis and the second axis are orthogonal, so as the sub-pixel units are square.

17. The stereoscopic display device of claim 12, wherein the first axis and the second axis are oblique, so as the sub-pixel units are parallelogram.

18. The stereoscopic display device of claim 17, wherein the first sub-pixel, the second sub-pixel, and third sub-pixel comprise a width, and the second sub-pixel row is shifted one-third to one-half of the width corresponding to the first sub-pixel row along the first axis, and the third sub-pixel row is shifted one-third to one-half of the width corresponding to the second sub-pixel row along the first axis.

* * * * *